United States Patent
Deschaintre et al.

(10) Patent No.: US 12,125,138 B2
(45) Date of Patent: Oct. 22, 2024

(54) NODE GRAPH OPTIMIZATION USING DIFFERENTIABLE PROXIES

(71) Applicant: Adobe Inc., San Jose, CA (US)

(72) Inventors: Valentin Deschaintre, London (GB); Yiwei Hu, New Haven, CT (US); Paul Guerrero, London (GB); Milos Hasan, Lafayette, CA (US)

(73) Assignee: Adobe Inc., San Jose, CA (US)

( * ) Notice: Subject to any disclaimer, the term of this patent is extended or adjusted under 35 U.S.C. 154(b) by 97 days.

(21) Appl. No.: 17/864,901

(22) Filed: Jul. 14, 2022

(65) Prior Publication Data

US 2024/0020916 A1 Jan. 18, 2024

(51) Int. Cl.
*G06T 15/04* (2011.01)
*G06T 17/00* (2006.01)
*G06V 10/82* (2022.01)

(52) U.S. Cl.
CPC .............. *G06T 17/00* (2013.01); *G06T 15/04* (2013.01); *G06V 10/82* (2022.01)

(58) Field of Classification Search
CPC . G06T 2207/20081; G06T 2207/20084; G06T 11/40; G06T 11/001; G06T 15/04; G06T 17/00; G06T 15/00; G06T 19/00; G06V 10/82
See application file for complete search history.

(56) References Cited

U.S. PATENT DOCUMENTS

2021/0343051 A1 11/2021 Hasan et al.

OTHER PUBLICATIONS

Gaillard et al., "Automatic Differentiable Procedural Modeling", published May 24, 2022, retrieved from Wiley Online Library at https://onlinelibrary.wiley.com/doi/epdf/10.1111/cgf.14475 (Year: 2022).*
Adobe, "Create 3D Models on Desktop and in VR", available online at <https://www.adobe.com/products/substance3d-modeler.html>, 9 pages.

(Continued)

*Primary Examiner* — Hau H Nguyen
(74) *Attorney, Agent, or Firm* — Nicholson De Vos Webster & Elliott LLP

(57) ABSTRACT

Embodiments are disclosed for optimizing a material graph for replicating a material of the target image. Embodiments include receiving a target image and a material graph to be optimized for replicating a material of the target image. Embodiments include identifying a non-differentiable node of the material graph, the non-differentiable node including a set of input parameters. Embodiments include selecting a differentiable proxy from a library of the selected differentiable proxy is trained to replicate an output of the identified non-differentiable node. Embodiments include generating an optimized input parameters for the identified non-differentiable node using the corresponding trained neural network and the target image. Embodiments include replacing the set of input parameters of the non-differentiable node of the material graph with the optimized input parameters. Embodiments include generating an output material by the material graph to represent the target image using the optimized input parameters for the non-differentiable node.

20 Claims, 12 Drawing Sheets

(56) References Cited

OTHER PUBLICATIONS

Combined Search and Examination Report, GB App. No. 2307194.7, Nov. 21, 2023, 5 pages.
Hu et al., "A Novel Framework for Inverse Procedural Texture Modeling", ACM Transactions on Graphics, vol. 38, No. 6, Article 186, Nov. 2019, 14 pages.
Hu et al., "An Inverse Procedural Modeling Pipeline for SVBRDF Maps", ACM Transactions on Graphics, vol. 41, No. 2, Article 18, Jan. 2022, 17 pages.
Shi et al., "MATch: Differentiable Material Graphs for Procedural Material Capture", ACM Trans. Graph., vol. 39, No. 6, Article 196, Dec. 2020, 15 pages.

* cited by examiner

NODE GRAPH OPTIMIZATION USING DIFFERENTIABLE PROXIES

BACKGROUND

Procedural modeling of material appearance provides a way to generate a visual appearance of a synthetic or physical material. Accurately representing the visual appearance to include structural elements such as block sizes or spacing between blocks of a material is one of the most challenging aspects of procedural modeling. Procedural modeling focuses on identifying material properties from a set of images that can be used to generate material appearances. Procedural modeling commonly uses a set of nodes that receive discrete parameters, such as from a user, to create the material appearance. This allows for textures and materials to be generated on-demand, rather than having to be prerendered and stored in a memory of a computing device

SUMMARY

Introduced here are techniques/technologies that relate to optimizing a material graph for generating material appearances. A material graph includes non-differentiable nodes and differentiable nodes used to generate material appearances. The non-differentiable nodes generate a material appearance from a set of input parameters that include a combination of discrete and continuous parameters. Each non-differentiable node is replicated using a differentiable proxy that is a trained machine learning model. The differentiable proxy is trained to replicate the functions of a non-differentiable node and produce an output material. To optimize the material graph, the differentiable proxy is used in place of the non-differentiable node and in combination with the differentiable nodes of the material graph.

By using the differentiable proxy, differentiable nodes, and a target image, an optimization of the material graph is performed to compute a set of optimized inputs that, when input to the original material graph, generates an output material representative of the target image. After computing the set of optimized inputs, the differentiable proxy is removed and the non-differentiable node replaced in the original position. Using the optimized set of inputs, the node graph optimization system replaces the inputs of non-differentiable node with the optimized set of inputs. The material graph then generates an output material using the optimized set of inputs.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
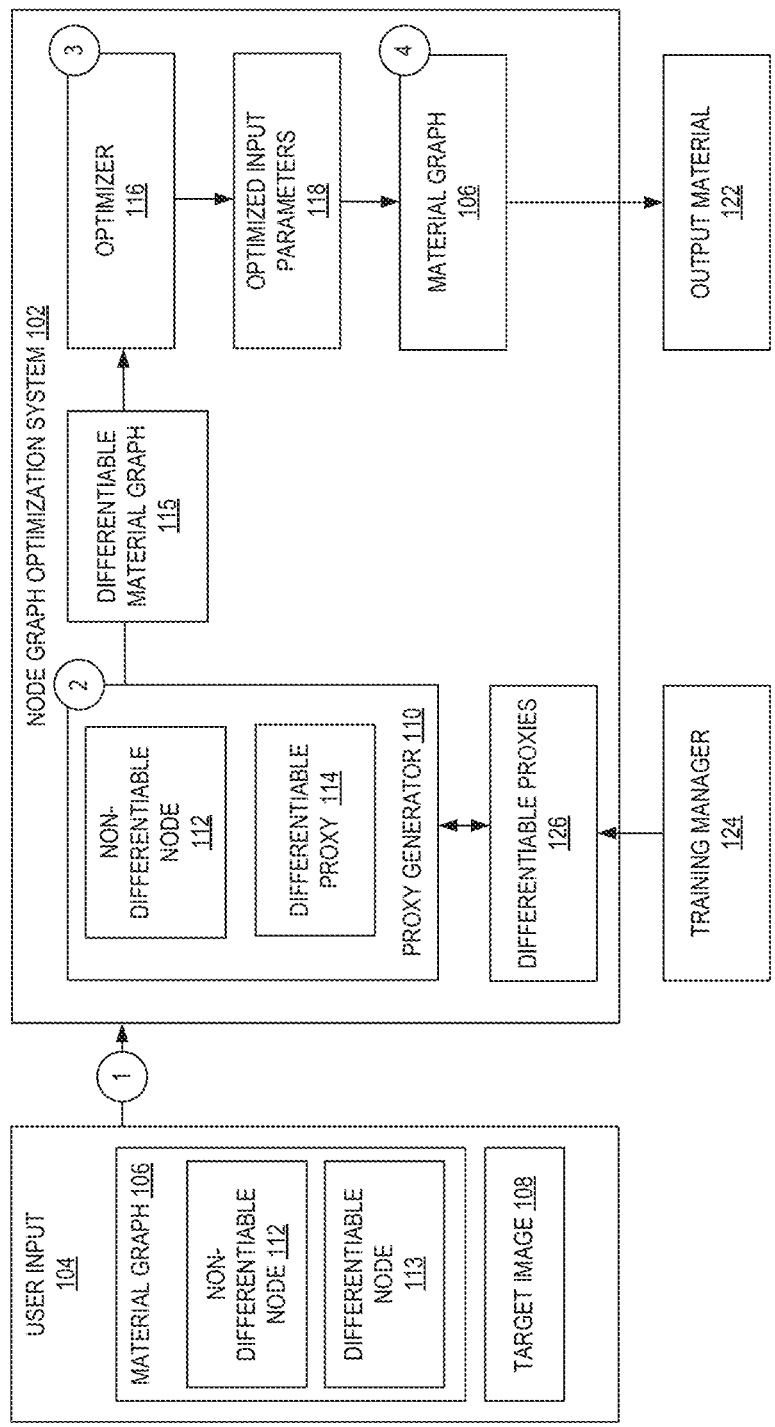
FIG. 1 illustrates a diagram of a process of performing node graph optimization in accordance with one or more embodiments.

One or more embodiments of the present disclosure include a node graph optimization system that uses a material graph to generate an output material to represent a target image. A material graph includes a series of differentiable nodes and non-differentiable nodes to generate an output material. A non-differentiable node within the material graph uses a procedure that relies on discrete parameters to produce the node output. Discrete parameters present challenges to optimization as procedures that use discrete parameters which are generally not differentiable.

Identifying the material properties presents challenges because procedural modeling often uses non-differentiable nodes such as generator nodes that rely on discrete parameters that must be manually tuned. These challenges often limit the identification of material properties and cause inaccurate visual appearance of a generated material appearance.

Existing techniques focus on generating a procedure from an image, materials, or user input. Some approaches estimate parameters of a given procedure to match an input image by training a neural network to learn user-exposed parameters, however, because the user-exposed parameters are both a limited set and arbitrary to each user, the resulting procedures are not able to be generalized or optimized.

Another approach implements a differentiable version of many filter nodes to optimize continuous parameters for the filter nodes to match a target material appearance. However, this approach is limited to filter nodes, which can only optimize certain visual aspects of the material appearance (e.g., albedo, color, roughness) and fails to match structural elements of the material appearance.

In still another approach, a user can specify a segment of a material for which a procedure can be generated. However, this approach is disconnected from material property optimization, preventing optimization of the procedure.

As discussed above, existing approaches lack the ability to perform optimization of non-differentiable nodes that rely on discrete parameters. As a result, existing techniques produce material appearances which lack the structural features of a material and thus are inaccurate representations of a target image. Alternatively, manual tuning of each non-differentiable node requires intensive skill and effort to perform individual adjustments or accept an output material that is not desirable.

To address these and other deficiencies of existing approaches, embodiments create a differentiable proxy for each non-differentiable node to generate an optimized set of inputs to the non-differentiable node. This provides an output material that represents a target image including structural elements of the target image.

Embodiments include creating a differentiable proxy for non-differentiable nodes in a material graph. By creating the differentiable proxy, the node graph optimization system performs an optimization of the entire material graph and generates an optimized set of input parameters. The optimized set of input parameters are used to generate output materials that represent a target image without loss of structural elements or requiring manual tuning of nodes within the material graph. To perform an optimization of the non-differentiable node, the node graph optimization system creates a differentiable proxy that is trained to replicate the procedure of the non-differentiable node. For example, the differentiable proxy is a machine learning model such as a neural network that learns a mapping of a set of input parameters to an output of the non-differentiable node. The node graph optimization system replaces the non-differentiable node with the differentiable proxy to perform an optimization of the material graph and outputs an optimized set of input parameters. Using the optimized set of input parameters, the material graph generates the output material that represents the target image. By creating the differentiable proxy, the node graph optimization system performs an optimization of the entire material graph and generates an optimized set of input parameters. The optimized set of input parameters are used to generate output materials that represent a target image without loss of structural elements or requiring manual tuning of nodes within the material graph.

By enabling the input parameters to be optimized, through the use of these proxies, embodiments provide on-demand modeling of target images. In particular, the use of differentiable proxies automates the tuning of material graphs, which enables embodiments to create more accurate procedurally generated materials based on the target images. The automatic tuning provides a responsive material graph that can model different target images without needing additional manual tuning for each target image. This allows target images with different structural elements to be accurately modeled without increasing the tuning time that would be needed in a typical system.

A differentiable proxy may include a machine-learning model that can be tuned (e.g., trained) based on training input to approximate unknown functions. In particular, a differentiable proxy is a neural network that can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. Additional details with respect to the use of neural networks within the node graph optimization system are discussed below with respect to FIGS. 1-12.

FIG. 1 illustrates a diagram 100 of a process of performing node graph optimization in accordance with one or more embodiments. As depicted in FIG. 1, a node graph optimization system 102 includes a proxy generator 110, an optimizer 116, optimized input parameters 120, and differentiable proxies 126. The node graph optimization system 102 receives a user input 104 that includes a material graph 106 and a target image 108. The user input 104 is received from a user by a user interface communicatively coupled to the node graph optimization system 102. A material graph 106 includes a series of nodes that has one or more non-differentiable nodes and one or more differentiable nodes. A target image 108 is a digital image that represents a physical or synthetic material.

At numeral 1, the node graph optimization system receives the user input 104 including the material graph 106 and the target image 108. In some embodiments, the node graph optimization system is implemented as part of a graphics editing application in which the user inputs selections via touchscreen input such as by a finger or stylus. In other embodiments, the user inputs selections using an additional device such as a mouse, keyboard, or other input device. The material graph is received with the target image 108 for the node graph optimization system to optimize the material graph to represent the material of the target image. Examples of the target image 108 include digital images captured by a camera device communicatively coupled to the node graph optimization system or stored in a memory, storage device, or other storage location accessible by the node graph optimization system. The material graph 106 includes a set of nodes that have at least one non-differentiable node 112 and a differentiable node 113. Additional details regarding the material graph are described below with respect to at least FIG. 2.

At numeral 2, the proxy generator 110 identifies a non-differentiable node 112 within the material graph 106. In some embodiments, the non-differentiable node 112 is a procedural generator that relies on discrete parameters. A procedure of the non-differentiable node 112 is a function that produces a graphical output. In an example, the non-differentiable node 112 uses the procedure to produce random shapes, pixels, or patterns depending on the type of the node. Different types of nodes are associated with generated different types of material appearances. Examples of node types include but are not limited to a brick generator, a tile generator, a gaussian noise generator, a cloud noise generator, or a fractal sum base generator.

In an example where the non-differentiable node 112 is a brick generator, the type of the non-differentiable node 112 is identified by the proxy generator 110 using metadata, a label, or other identifier. The procedure of the brick generator is to create brick patterns with a set of input parameters including, but not limited to a number of bricks, a bevel for each brick, a gap distance between bricks, a height of bricks, a slope of bricks, a variance between heights/widths, a stochasticity parameter, and an expansion ratio that represents a compression or stretching of a square brick shape. Each of these input parameters is a discrete value that is used each time the procedure is executed. For instance, the brick generator can apply the procedure to the input parameters and produce an output material with a particular number of bricks, depending on the input parameters. However, using the procedure, the brick generator is not able to determine an optimized set of input parameters to reproduce a target image if provided the target image without a set of discrete parameters. To determine the optimized set of parameters, the node graph optimization system 102 uses a proxy generator to select a differentiable proxy 114 for the non-differentiable node 112.

The proxy generator 110 uses the node type to retrieve a differentiable proxy 114 that replicates the procedure of the non-differentiable node 112 from a library of differentiable proxies 126. The differentiable proxy 114 is a trained machine learning model (e.g., a neural network) that is trained to learn the mapping between an output of the non-differentiable node 112 and a set of inputs to the non-differentiable node. Each differentiable proxy 114 is trained for a specific non-differentiable node. For example, separate differentiable proxies 114 would be trained to learn a brick generator and a cloud generator, respectively. In the brick generator example, the differentiable proxy 114 can determine a set of input parameters from the target image and generate an output approximation that represents the target image. During the training process, the differentiable proxy 114 learns a one-to-one mapping between each input in the set of inputs and the perceptual characteristics of the output approximation. The differentiable proxy 114 can be optimized (e.g., is differentiable) because of the one-to-one mapping learned during training. Each input of the set of inputs can be optimized as described below with regard to numeral 3.

In some embodiments, the material graph 106 includes multiple non-differentiable nodes 112. To handle multiple non-differentiable nodes 112, the proxy generator 110 identifies a differentiable proxy 114 for each non-differentiable node 112 of the material graph 106. While FIGS. 1-4 may describe the material graph 106 with a single non-differentiable node and a single differentiable node, this is not limiting, and any configuration or combination of nodes can be used.

After the differentiable proxy 114 is selected, the proxy generator 110 replaces each non-differentiable node 112 in the material graph 106 with the selected differentiable proxy 114. By replacing each non-differentiable node 112, the proxy generator 110 creates a differentiable material graph 115 that can be processed by the optimizer 116. The differentiable material graph 115 includes any differentiable nodes in the material graph 106 and the differentiable proxy 114.

At numeral 3, the optimizer 116 performs a multi-stage optimization of the differentiable material graph 115. In some embodiments, the optimizer 116 performs a three-stage optimization of the differentiable material graph. For the three-stage optimization, a first stage of the optimization is performed to optimize all differentiable nodes (e.g., filter nodes) in the material graph 106 while each differentiable proxy 114 remains fixed. In a second stage of the optimization, the optimizer 116 performs a global initialization on both the differentiable nodes in the material graph 106 and each differentiable proxy 114. In a third stage of the optimization, the optimizer 116 generates globally optimized parameters by applying a combination of a feature loss and a style loss. Additional details of performing the optimization are described with respect to FIG. 3.

Using the three-stage optimization, the optimizer 116 computes a set of optimized input parameters 118. The optimized input parameters 118 represent input parameters that, when input to the differentiable material graph 115, generate an output material that represents the target image 108. The optimized input parameters 118 also generate an output material that represents the target image 108 when input to the material graph 106 that includes the non-differentiable nodes and the differentiable nodes.

At numeral 4, node graph optimization system 102 replaces the existing input parameters of the material graph 106 with the optimized input parameters 118. In an example, the node graph optimization system 102 removes each value (e.g., number of bricks, height of bricks, etc.) of the input parameters for the material graph 106 and replaces each value with a corresponding value of the optimized input parameters 118.

The material graph 106 uses the optimized input parameters 118 to generate an output material 122 that represents the target image 108. In some embodiments with multiple types of nodes, a subset of the optimized input parameters 118 (e.g., brick generator parameters are provided to brick generator nodes, blur filter parameters are provided to a blur filter, etc.) are provided to each non-differentiable node 112 and each differentiable node in the material graph 106. The node graph optimization system 102 can provide a portion or all of the output material 122 to a user interface for display to a user.

In some embodiments, a training manager 124 performs asynchronous training for multiple neural networks to generate the library of differentiable proxies 126. The training manager 124 trains each neural network using training data involving a pair that includes a non-differentiable node type (e.g., brick generator), a training set of parameters, and a ground truth output of the non-differentiable node (e.g., a brick pattern). The neural networks learn, using a loss function, to minimize a pixelwise difference between an approximated generator map (e.g., an output of each neural network) and a ground truth output of the non-differentiable node. At completion of training, the training manager 124 adds each neural network to the library of differentiable proxies 126. Additional details of the training manager and training process are described with respect to FIGS. 5 and 10.

Figure 2:
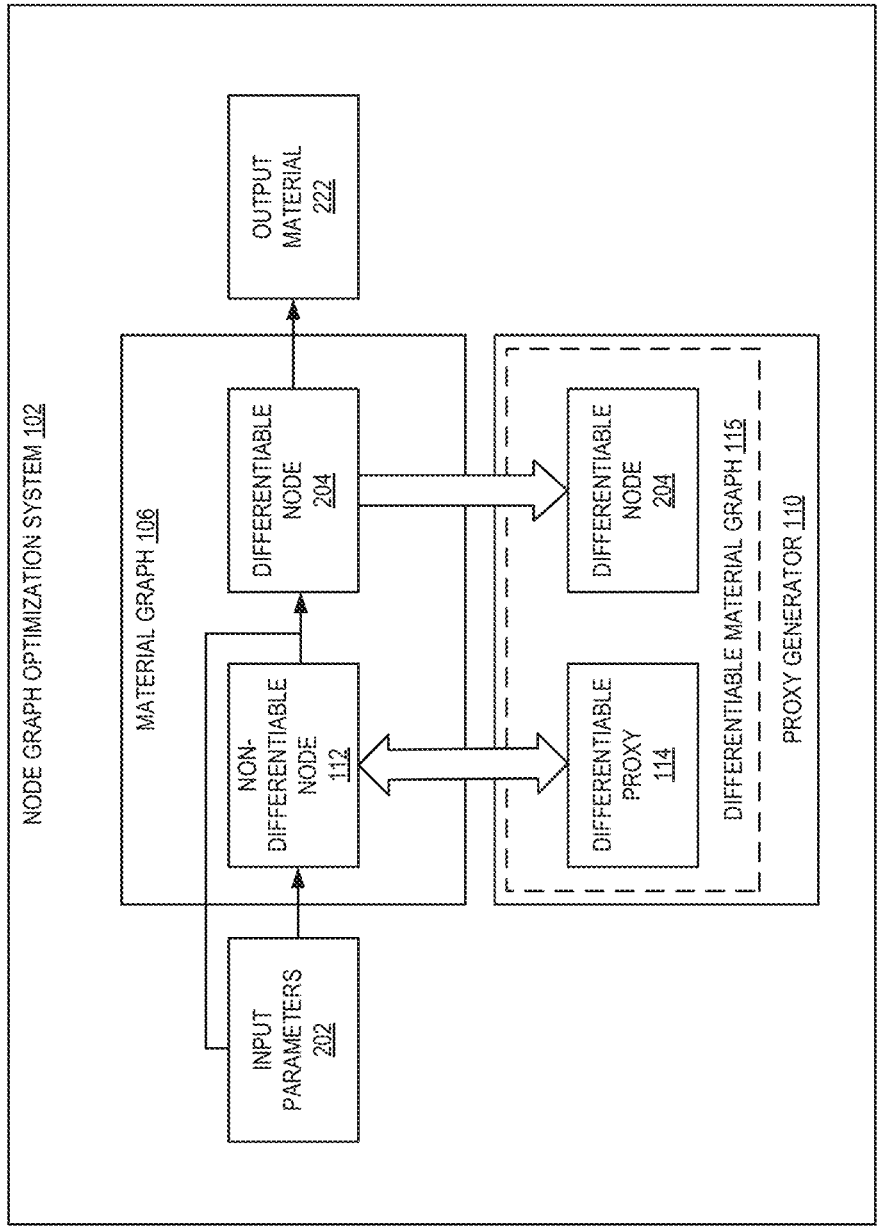
FIG. 2 illustrates a diagram of a replacing a non-differentiable node of a material graph in accordance with one or more embodiments.

FIG. 2 illustrates a diagram of a replacing a non-differentiable node of a material graph in accordance with one or more embodiments. As described above, the material graph 106 includes a non-differentiable node 112 (e.g., a procedural generator) and a differentiable node 204 (e.g., a filter node). While FIG. 2 depicts a single non-differentiable node 112 and a single differentiable node 204, the material graph 106 can have any number of nodes. The material graph 106 generates output material 222 (e.g., a pattern, image, or synthetic material) from the input parameters 202 using the configurations of non-differentiable node 112 and differentiable node 204. The input parameters 202 can include discrete parameters as input for the non-differentiable node 112 and continuous parameters as input for the differentiable node 204. As illustrated in FIG. 2, the input parameters 202 can be a single set of values from which a subset is provided to the respective node type. The input parameters 202 can be received by user selections or from a set of predetermined input parameters previously associated with the material graph 106.

As described above, the proxy generator 110 identifies the non-differentiable node 112 and performs a replacement with the selected differentiable proxy 114. To replace the non-differentiable node 112, the proxy generator 110 removes the non-differentiable node 112 from the material graph 106 and inserts the differentiable proxy 114 into the material graph 106. After insertion of the differentiable proxy 114, the node graph optimization system 102 can provide the differentiable material graph 115 to the optimizer to perform an optimization of all nodes in the differentiable material graph 115. Additional details of the optimization process are described below with reference to FIG. 3.

In some embodiments with multiple non-differentiable nodes, the proxy generator 110 replaces each non-differentiable node with a corresponding differentiable proxy to form the differentiable material graph 115. For non-differentiable nodes that are of the same type (e.g., one brick generator and another brick generator) in the material graph, the same differentiable proxy 114 may be used in more than one replacement operation.

Figure 3:
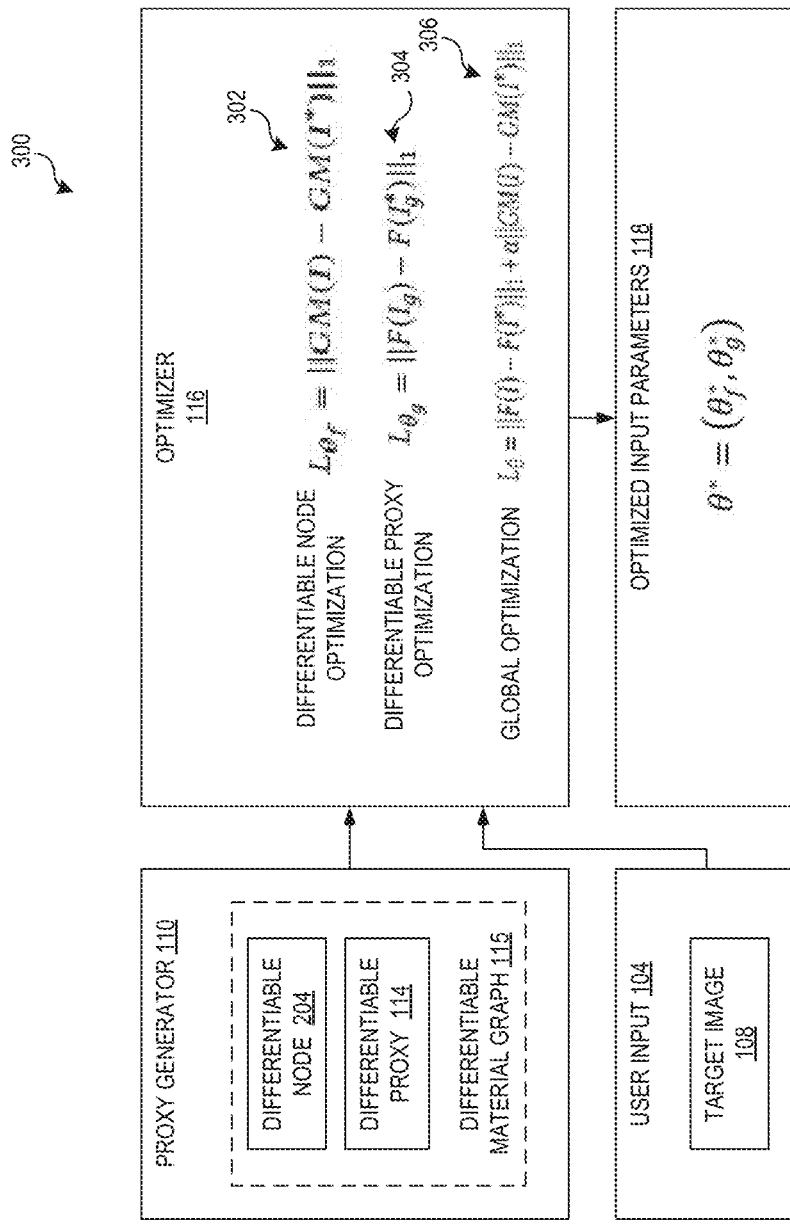
FIG. 3 illustrates a diagram of an optimization process using a differentiable proxy in accordance with one or more embodiments.

FIG. 3 illustrates a diagram of an optimization process of a differentiable material graph in accordance with one or more embodiments. As described above, after replacing the non-differentiable nodes in the material graph with differentiable proxies, the material graph is transformed to a differentiable material graph and able to be optimized.

The optimizer 116 receives the target image 108 from the user input 104 and differentiable material graph 115 including a differentiable proxy 114 and a differentiable node 204 from the proxy generator 110. To perform an optimization, the optimizer 116 represents the set of input parameters for the differentiable proxy 114 as $\theta_g$ and represents the set of input parameters for the differentiable node 204 as $\theta_f$. For example, $\theta_g$ and $\theta_f$ may be vector representations of the respective input parameters. To represent the set of all optimizable parameters, the optimizer defines an input parameter $\theta$ as $\theta(\theta_g, \theta_f)$. The differentiable material graph 115 is represented as G and defines a set of two-dimensional material maps $M=G(\theta)$. Examples of two-dimensional material maps include representations of physical properties such as albedo, normal, roughness, and metallic maps. For example, an albedo material map is a base color map that defines the color of diffused light from the material. A normal material map represents surface details of the material such as bumps, grooves, and scratches to the material. A roughness material map represents surface irregularities using a ratio of smooth to rough. A metallic material map represents portions of the material which are metals and portions of the material which are non-metal. The set of two-dimensional material maps generated by the differentiable material graph are synthesized by a rendering function R to generate the output material that is represented by $I=R(M)$. The target image 108 is represented by $I^*$.

The optimizer 116 computes optimized input parameters, represented by $\theta^*=(\theta^*_f, \theta^*_g)$, that minimizes a pixel difference between the output material I and the target image $I^*$. For instance, $\theta^*_f$ is the set of input parameters for the differentiable node 204 that minimizes the loss function 302. To compute the optimized input parameter $\theta^*_f$, the optimizer 116 optimizes the differentiable node 204 using a loss function 302 such as $L_{\theta_f}=\|GM(I)-GM(I^*)\|_1$, where GM is an operator that computes Gram Matrices of extracted deep features. In some embodiments, the loss function 302 is computed at multiple resolutions that can be combined (e.g., 256×256, 128×128, 64×64). The optimization of the differentiable node 204 represents an optimization of some material properties (e.g., albedo and roughness).

After generating optimized parameters $\theta^*_f$ for the differentiable node 204, the optimizer 116 performs an initialization (i.e., in a second stage) for the differentiable proxy 114. For instance, $\theta^*_g$ is the set of input parameters for the differentiable proxy 114 that minimizes the loss function 304. To perform the initialization on the differentiable proxy 114, the optimizer 116 generates optimized parameters $\theta^*_g$ for the differentiable proxy 114 using a loss function 304 that minimizes a difference in the deep features of the output material I and the target image $I^*$. The loss function 304 is represented by $L_{\theta_g}=\|F(I_g)-F(I^*_g)\|$ where F denotes the extracted deep features from a pre-trained neural network, and $I_g$ and $I^*_g$ are grayscale representations of the output material I and the target image $I^*$. In some embodiments, the pre-trained neural network is VGG19 or another image classifier that is trained to extract features of objects within an image.

In some embodiments, the optimizer 116 performs an third stage of the optimization of the differentiable material graph 115 to generate optimized parameters $\theta^*$ by applying a combination of a feature loss and a style loss, that is represented by the loss function $L_\theta=\|F(I)-F(I^*)\|_1+\alpha\|GM(I)-GM(I^*)\|_1$, where a is a weighting variable. The weighting variable is used to match the overall statistics of material appearance because an output material of the non-differentiable node 112 and replicated by the differentiable proxy 114 may include synthetic materials. An example value of the weighting variable is $\alpha=0.05$.

Figure 4:
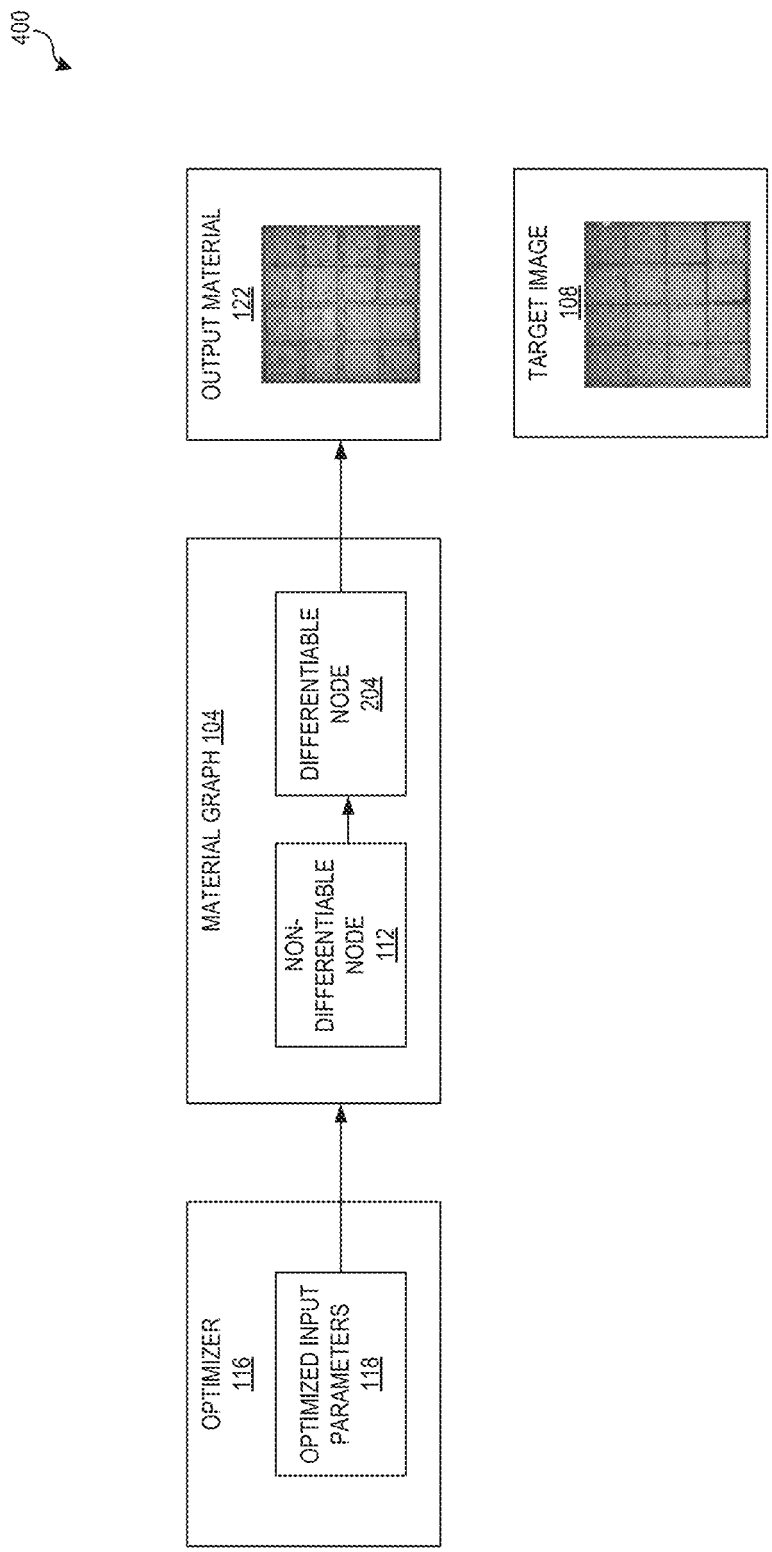
FIG. 4 illustrates a diagram of process of generating an output material with optimized input parameters in accordance with one or more embodiments.

FIG. 4 illustrates a diagram of process of generating an output material with optimized input parameters in accordance with one or more embodiments. After the optimizer 116 generates optimized input parameters 118 as described above with reference to FIG. 3, the optimized input parameters 118 are input to the material graph 106 that includes the non-differentiable node 112 and the differentiable node 204. The material graph 106 receives the optimized input parameters 120 and uses non-differentiable node 112 and differentiable node 204 to generate the output material 122 that represents the target image 108. As illustrated in FIG. 4, the output material 122 represents the tile structure and appearance of the target image 108.

For instance, the output material 122 replicates the spacing between tiles, the number of tiles, as well as the color and appearance of the target image 108. While the example illustrated in FIG. 4 is a target image 108 including a tile structure, embodiments of the present disclosure are used for any type of target image with any material appearance including a structure. Other examples include but are not limited to bricks patterns, scratch patterns, arc pavement, etc.

In some embodiments, the node graph optimization system 102 removes the differentiable proxy 114 and restores each original non-differentiable node 112 to a position in the material graph 106 where the non-differentiable node 112 was located prior to the proxy generator 110 inserting the differentiable proxy 114. For example, the output material 122 can be generated by the material graph 106 using the optimized input parameters 118.

Figure 5:
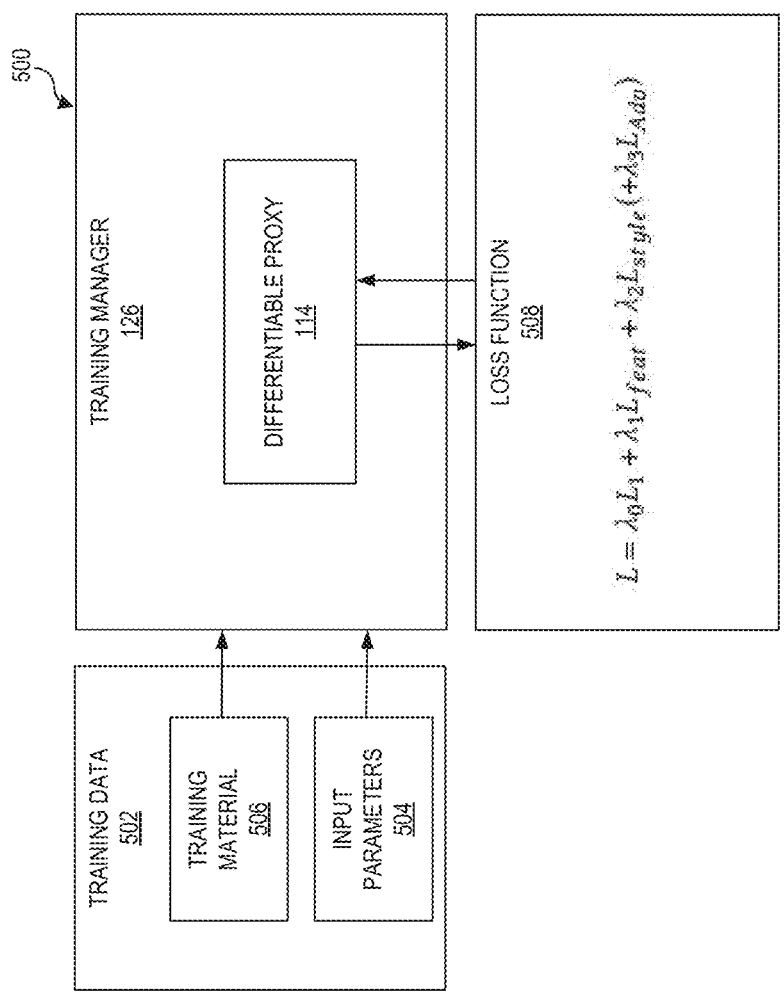
FIG. 5 illustrates a training process for a differentiable proxy of a node graph optimization system in accordance with one or more embodiments.

FIG. 5 illustrates a training process for a differentiable proxy of a node graph optimization system in accordance with one or more embodiments. For instance, the differentiable proxy 114 may be trained by the training manager 124. The training manager 124 obtains a set of training data 502 that includes input parameters 504 and training material 506. The input parameters 504 include discrete values of inputs (e.g., number of bricks, brick spacing, etc.) for a non-differentiable node. The training material 506 represents the output of the non-differentiable node using the input parameters 504.

During the training process, the input parameters 504 and training material 506 are used to train the differentiable proxy 114 to replicate the procedure of the non-differentiable node. Varying values of input parameters 504 and corresponding training material are used by the training manager 124 to train the differentiable proxy 114 to learn one-to-one mapping between each input in the set of inputs and the perceptual characteristics of the output approximation. The differentiable proxy 114 generates an approximated generator map to produce an approximation of the training material and applies loss function 508 that minimizes the pixel difference between the training material 506 and the output of the differentiable proxy 114.

The loss function 508 is represented by $L=\lambda_1 L_1 + \lambda_1 L_{feat} + \lambda_2 L_{style} + \lambda_3 L_{Adv}$), where the $L_1$ loss is an absolute difference, the deep feature loss is an L1 difference between deep feature maps extracted from a pre-trained neural network, the style loss is an L1 difference between the Gram Matrices of extracted deep feature maps, and an optional adversarial loss that is used for target materials that include stochastic patterns (e.g., the non-differentiable node being replicated is a stochastic generator). In some embodiments, the training material 506 can be labeled with a type of non-differentiable node (e.g., brick generator, scratch generator, tile generator, etc.). A comparison between the training material 506 and the output of various differentiable proxies 114 is illustrated and described below with reference to FIG. 6.

Figure 6:
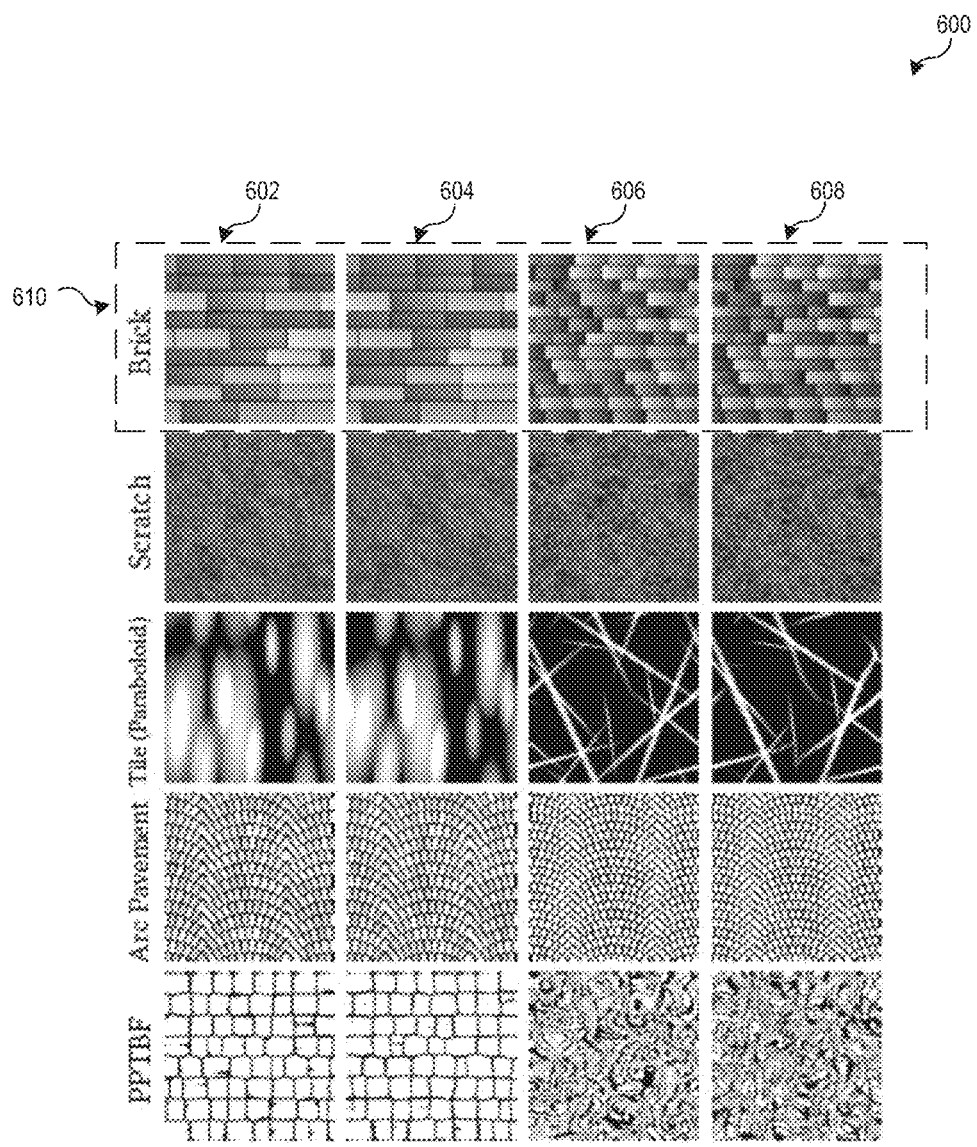
FIG. 6 illustrates an example comparison of visual results of output materials from an original non-differentiable node and output material from the node graph optimization system in accordance with one or more embodiments.

FIG. 6 illustrates an example comparison of perceptual results of various output materials and corresponding outputs of various differentiable proxies in accordance with one or more embodiments. In particular, FIG. 6 illustrates output materials of a non-differentiable node and a corresponding approximation by a differentiable proxy that is trained to replicate the procedure of the non-differentiable node according to various embodiments discussed herein.

As illustrated in FIG. 6, columns 602 and 606 depict the various output materials of the various non-differentiable nodes (e.g., a non-differentiable node 112). In columns 604 and 608, the approximations generated by the various differentiable proxies (e.g., a differentiable proxy 114) are depicted.

In an example, in row 610, the non-differentiable node type is a brick generator. As illustrated in columns 602 and 606, the brick generator produces an output with a number of bricks, a spacing between bricks, and other perceptual characteristics using input parameters as described above. The differentiable proxy that is trained to replicate the procedure of the brick generator creates the output material in columns 604 and 608.

Other types of non-differentiable node types including a scratch generator, a tile generator, an arc pavement generator, and a point process texture basis feature (PPTBF) are shown. The columns 602 and 604 for each type of non-differentiable node generates an output using input parameters for the type of non-differentiable node as described above.

Figure 7:
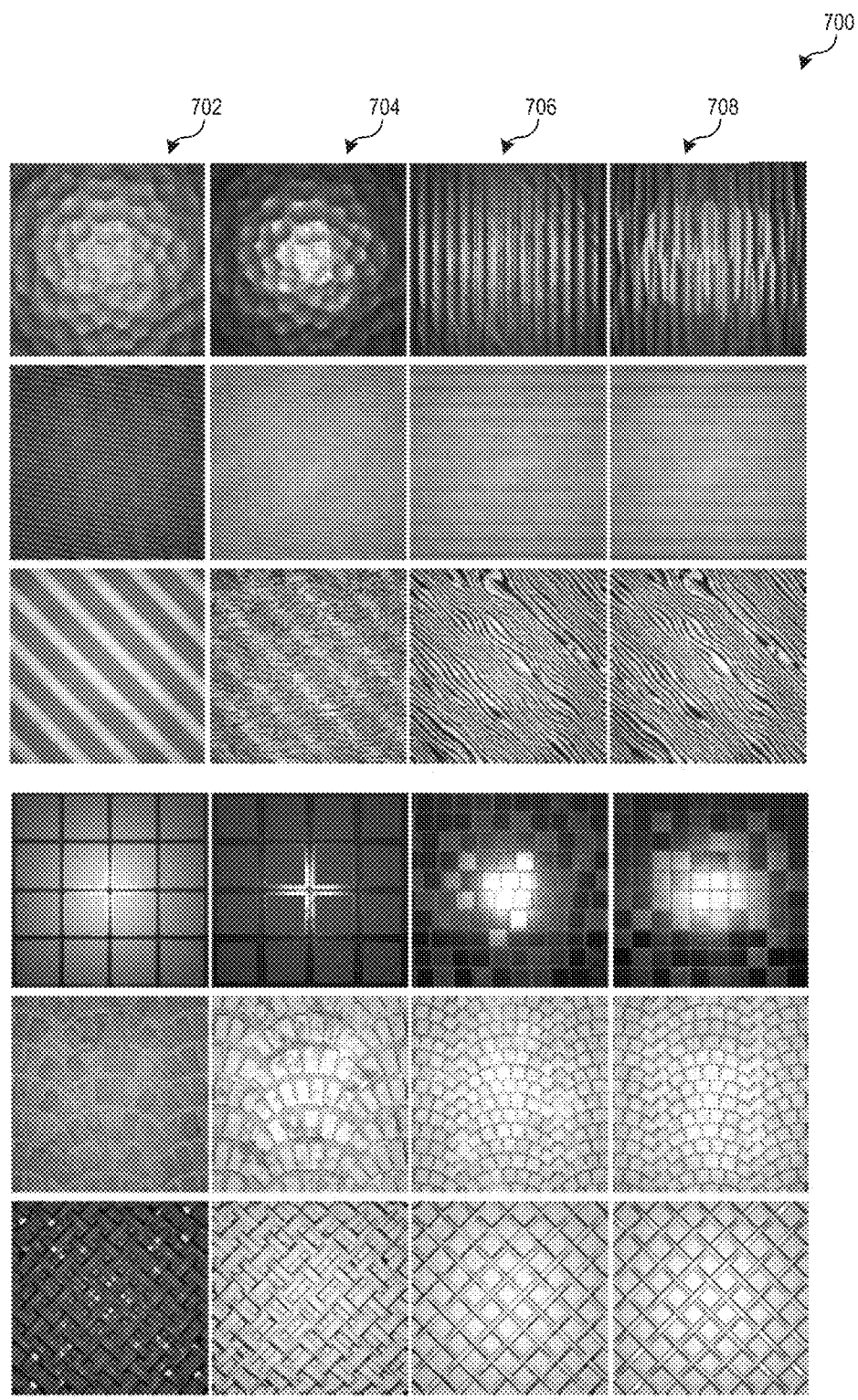
FIG. 7 illustrates an example comparison of visual results of different output materials from the node graph optimization system with target images in accordance with one or more embodiments.

FIG. 7 illustrates an example comparison of perceptual results of output materials from an original non-differentiable node and output material from the node graph optimization system with target images in accordance with one or more embodiments. In particular, FIG. 7 illustrates an output material 702 of the material graph 106, an output 704 with filter optimization only, an output material 706 of the node graph optimization system, and a target image 708. The output material 702 of the material graph 106 illustrates an output of a non-differentiable node without optimization. The output 704 is a typical approach that includes optimization of filters but no optimization of the non-differentiable node. The chart 700 illustrates that the output material 706 using embodiments described herein significantly outperforms the material graph 106 and the output 704 with filter optimization only. As illustrated in FIG. 7, the output material 706 using embodiments described herein represent the structural elements of the target image 708 more accurately.

Figure 8:
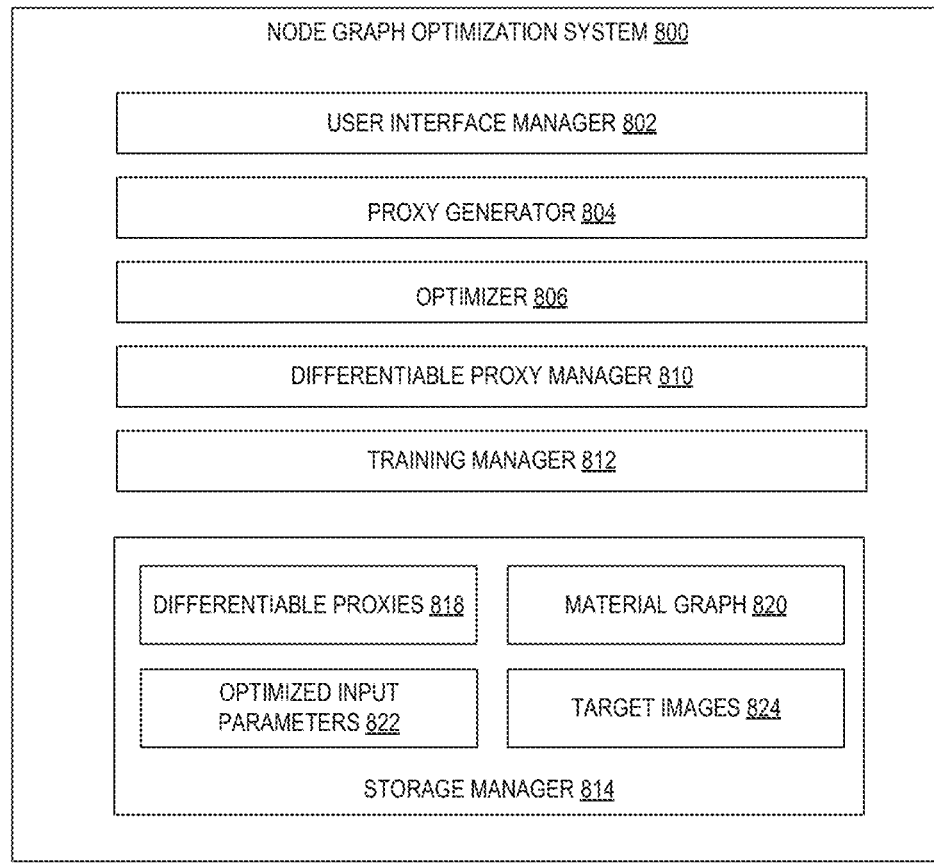
FIG. 8 illustrates a schematic diagram of a node graph optimization system in accordance with one or more embodiments.

FIG. 8 illustrates a schematic diagram of a node graph optimization system (e.g., "node graph optimization system 102" described above) in accordance with one or more embodiments. As shown, the node graph optimization system 800 may include, but is not limited to, user interface manager 802, proxy generator 804, optimizer 806, differentiable proxy manager 810, training manager 812, and storage manager 814. The storage manager 814 includes differentiable proxies 818, material graph 820, optimized input parameters 822, and target images 824.

As illustrated in FIG. 8, the node graph optimization system 800 includes a user interface manager 802. For example, the user interface manager 802 allows users to provide target images 824 and selections of nodes or material graphs 820 to the node graph optimization system 800. In some embodiments, the user interface manager 802 provides a user interface through which the user can upload the target images 824 which represent the output materials to be generated, as discussed above. Alternatively, or additionally, the user interface may enable the user to download the images from a local or remote storage location (e.g., by providing an address (e.g., a URL or other endpoint) associated with an image source). In some embodiments, the user interface can enable a user to link an image capture device, such as a camera or other hardware to capture image data and provide it to the node graph optimization system 800.

Additionally, the user interface manager 802 allows users to request the node graph optimization system 800 to analyze a material graph 820 and generate a set of optimized input parameters 822 to match a target image. For example, the node graph optimization system selects a differentiable proxy for non-differentiable nodes of the material graph and performs a fully differentiable optimization. In some embodiments, the user interface manager 802 enables the user to view the optimized input parameters or the material output.

As illustrated in FIG. 8, the node graph optimization system 800 includes a proxy generator 804. The proxy generator 804 can receive a material graph 820 and a target image 824 and coordinate other components of the node graph optimization system 800 to identify one or more non-differentiable nodes in the material graph and select a differentiable proxy from a library of trained differentiable proxies. For example, as discussed, a material graph 820 can include a series of non-differentiable nodes and differentiable nodes. The proxy generator 804 selects a differentiable proxy (e.g., a trained neural network) for each non-differentiable node. Each of the non-differentiable nodes are replaced by the selected differentiable proxy.

As illustrated in FIG. 8, the node graph optimization system 800 also includes an optimizer 808. The optimizer 808 receives the target image 824 and the material graph 820 that includes the differentiable proxies and differentiable nodes. The optimizer 808 performs an optimization of each differentiable node and each differentiable proxy. The optimizer 808 computes an optimized set of input parameters that result in an output material representing the target image 824.

As illustrated in FIG. 8, the node graph optimization system 800 also includes a differentiable proxy manager 810. Differentiable proxy manager 810 may host a plurality of differentiable proxies (e.g., neural networks or other machine learning models). The differentiable proxy manager 810 may include an execution environment, libraries, and/or any other data needed to execute the differentiable proxies. In some embodiments, the differentiable proxy manager 810 may be associated with dedicated software and/or hardware resources to execute the differentiable proxies. As discussed, trained differentiable proxies 818 can be implemented as any type of generator network, such as the generator of Style-GAN or other generators. In various embodiments, each trained differentiable proxy hosted by differentiable proxy manager 810 may be the same type of generator or may be different types of generators, depending on implementation. Although depicted in FIG. 8 as being hosted by a single differentiable proxy manager 810, in various embodiments the trained differentiable proxies 818 may be hosted in multiple differentiable proxy managers and/or as part of different components. For example, each trained differentiable proxy can be hosted by their own differentiable proxy manager, or other host environment, in which the respective differentiable proxies execute, or the differentiable proxies may be spread across differentiable proxy managers depending on, e.g., the resource requirements of each own differentiable proxy, etc.

As illustrated in FIG. 8 the node graph optimization system 800 also includes training manager 812. The training manager 812 can teach, guide, tune, and/or train one or more neural networks (e.g., differentiable proxies). In particular, the training manager 812 can train a differential proxy based on a plurality of training data. For example, the differential proxies 818 may be trained to replicate an output material of a non-differentiable node of a material graph. Additionally, the differential proxies 818 may be further optimized using loss functions, as discussed above, using a combination of deep feature loss and style loss. More specifically, the training manager 812 can access, identify, generate, create, and/or determine training input and utilize the training input to train and fine-tune a differentiable proxy. For instance, the training manager 812 can train the differential proxies 818, end-to-end, as discussed above.

As illustrated in FIG. 8, the node graph optimization system 800 also includes the storage manager 814. The storage manager 814 maintains data for the node graph optimization system 800. The storage manager 814 can maintain data of any type, size, or kind as necessary to perform the functions of the node graph optimization system 800. The storage manager 814, as shown in FIG. 8, includes the differentiable proxies 818. The differentiable proxies 818 can include a set of neural networks that are trained to replicate the output of a non-differentiable node in a material graph. In particular, in one or more embodiments, the differentiable proxies 818 include one or more neural networks to replicate functions of multiple types of non-differentiable nodes such as brick generator, tile generator, scratch generator, etc.

As further illustrated in FIG. 8, the storage manager 814 also includes material graph 820. Material graph 820 can include a series of nodes including differentiable nodes and non-differentiable nodes that generate an output material from a set of input parameters. The storage manager 814 may also include optimized input parameters 822. The optimized input parameters 822 may include a set of input parameters that, when input to the material graph, result in an output material that represents a target image 824. The storage manager 814 may further include target images 824. The target images 824 may correspond to material appearances that are intended to be represented by the node graph optimization system such as images of physical material or synthetically generated materials.

Each of the components 802-814 of the node graph optimization system 800 and their corresponding elements (as shown in FIG. 8) may be in communication with one another using any suitable communication technologies. It will be recognized that although components 802-814 and their corresponding elements are shown to be separate in FIG. 8, any of components 802-814 and their corresponding elements may be combined into fewer components, such as into a single facility or module, divided into more components, or configured into different components as may serve a particular embodiment.

The components 802-814 and their corresponding elements can comprise software, hardware, or both. For example, the components 802-814 and their corresponding elements can comprise one or more instructions stored on a computer-readable storage medium and executable by processors of one or more computing devices. When executed by the one or more processors, the computer-executable instructions of the node graph optimization system 800 can cause a client device and/or a server device to perform the methods described herein. Alternatively, the components 802-814 and their corresponding elements can comprise hardware, such as a special purpose processing device to perform a certain function or group of functions. Additionally, the components 802-814 and their corresponding elements can comprise a combination of computer-executable instructions and hardware.

Furthermore, the components 802-814 of the node graph optimization system 800 may, for example, be implemented as one or more stand-alone applications, as one or more modules of an application, as one or more plug-ins, as one or more library functions or functions that may be called by other applications, and/or as a cloud-computing model. Thus, the components 802-814 of the node graph optimization system 800 may be implemented as a stand-alone application, such as a desktop or mobile application. Furthermore, the components 802-814 of the Node graph optimization system 800 may be implemented as one or more web-based applications hosted on a remote server. Alternatively, or additionally, the components of the Node graph optimization system 800 may be implemented in a suit of mobile device applications or "apps."

Figure 9:
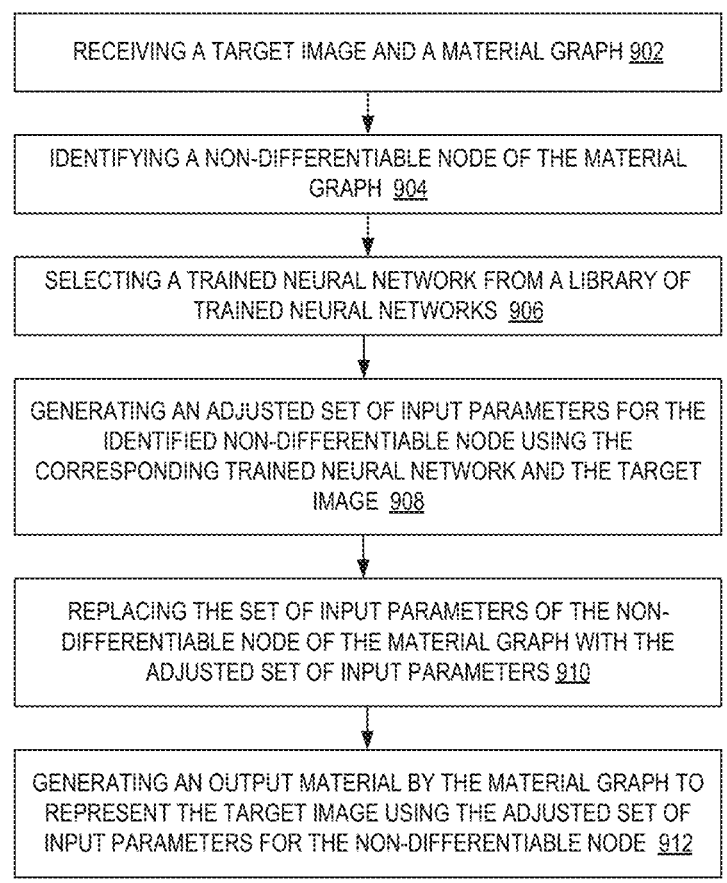
FIG. 9 illustrates a flowchart of a series of acts in a method of node graph optimization in accordance with one or more embodiments.
Figure 10:
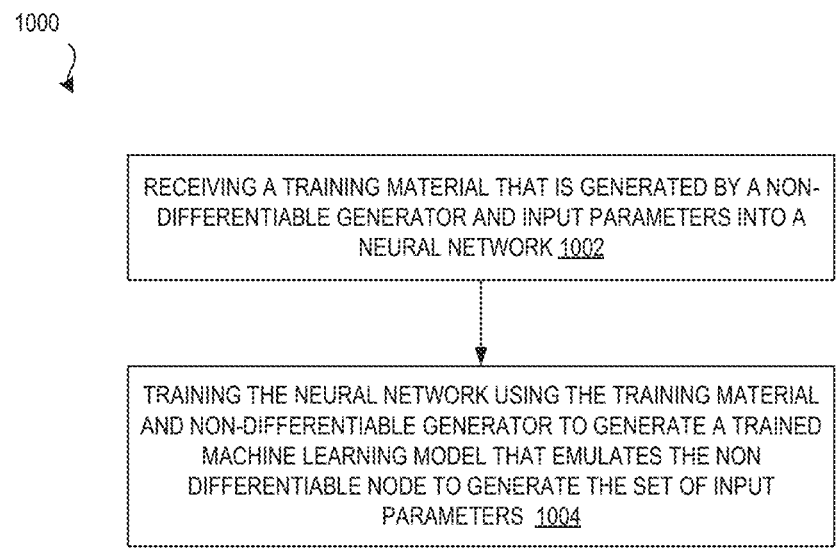
FIG. 10 illustrates a flowchart of a series of acts in a method of training a differentiable proxy of a node graph optimization system in accordance with one or more embodiments.

FIGS. 1-8, the corresponding text, and the examples, provide a number of different systems and devices that allows a user to perform optimization of a material graph including non-differentiable nodes. In addition to the foregoing, embodiments can also be described in terms of flowcharts comprising acts and steps in a method for accomplishing a particular result. For example, FIGS. 9 and 10 illustrate flowcharts of exemplary methods in accordance with one or more embodiments. The methods described in relation to FIGS. 9 and 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart 900 of a series of acts in a method of node graph optimization in accordance with one or more embodiments. In one or more embodiments, the method 900 is performed in a digital medium environment that includes the node graph optimization system 800. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of receiving a target image and a material graph that is to be optimized for replicating a material of the target image. In some embodiments, the node graph optimization system receives the material graph and the target image from a user interface of a graphics editing application in which the user inputs selections via a device such as a mouse, keyboard, or other input device.

As illustrated in FIG. 9, the method 900 includes an act 904 of identifying a non-differentiable node of the material graph, wherein the non-differentiable node includes a set of input parameters. In some embodiments, the node graph optimization system identifies the non-differentiable nodes using metadata, a name, or other identifier to indicate the function of the non-differentiable node. The non-differentiable node is a procedural generator that creates a set of material maps that are synthesized to create a visual pattern.

As illustrated in FIG. 9, the method 900 includes an act 906 of selecting a differentiable proxy from a library of differentiable proxies, the selected differentiable proxy being trained to replicate an output of the identified non-differentiable node. The node graph optimization system selects the differentiable proxy that is trained to replicate the procedure of the non-differentiable node identified at act 902.

As illustrated in FIG. 9, the method 900 includes an act 908 of generating an optimized set of input parameters for the identified non-differentiable node using the corresponding trained neural network and the target image. The node optimization system performs an optimization of the differentiable proxies and the differentiable nodes. In some embodiments, the optimization includes a first stage that optimizes all differentiable nodes while each differentiable proxy remains fixed. The optimization also includes a second stage that optimizes all the differentiable nodes and the differentiable proxies. At the completion of the first stage and the second stage, the node graph optimization system generates optimized input parameters that, when input to the material graph, represent the target image received at act 902.

As illustrated in FIG. 9, the method 900 includes an act 910 of replacing the set of input parameters of the non-differentiable node of the material graph with the optimized input parameters. The node graph optimization system uses the optimized set of input parameters to replace the input parameters of the non-differentiable node of the material graph. In some embodiments, the node graph optimization system removes the input parameters from the non-differentiable node and inserts the optimized input parameters into the non-differentiable node of the material graph.

As illustrated in FIG. 9, the method 900 includes an act 912 of generating an output material by the material graph to represent the target image using the optimized input parameters for the non-differentiable node. The material graph generates an output material from the optimized input parameters using the series of differentiable nodes and non-differentiable nodes. The output material represents the target image.

FIG. 10 illustrates a flowchart 1000 of a series of acts in a method of node graph optimization in accordance with one or more embodiments. In one or more embodiments, the method 1000 is performed in a digital medium environment that includes the node graph optimization system 800. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving a training material and a set of input parameters into the differentiable proxy. A training manager receives training material that is generated by a non-differentiable node and input parameters into a neural network. The training manager trains the differentiable proxy using the training material and input parameters to generate a trained machine learning model that generates optimized input parameters that replicate the training material.

In some embodiments, the training manager trains the differentiable proxy by sampling a plurality of procedural parameters of the non-differentiable node and a ground truth image and training the differentiable proxy to minimize a pixel difference between an output material and the ground truth image.

As illustrated in FIG. 10, the method 1000 includes an act 1004 of training the neural network using the training material and input parameters to generate a trained machine learning model that generates optimized input parameters for the material graph that represents the target image. For example, the neural network is trained using training data involving a pair that includes a non-differentiable node type and a ground truth output of the non-differentiable node. Each neural network learns, using a loss function, to minimize a pixelwise difference between an output of each neural network and a ground truth output of the non-differentiable node.

Figure 11:
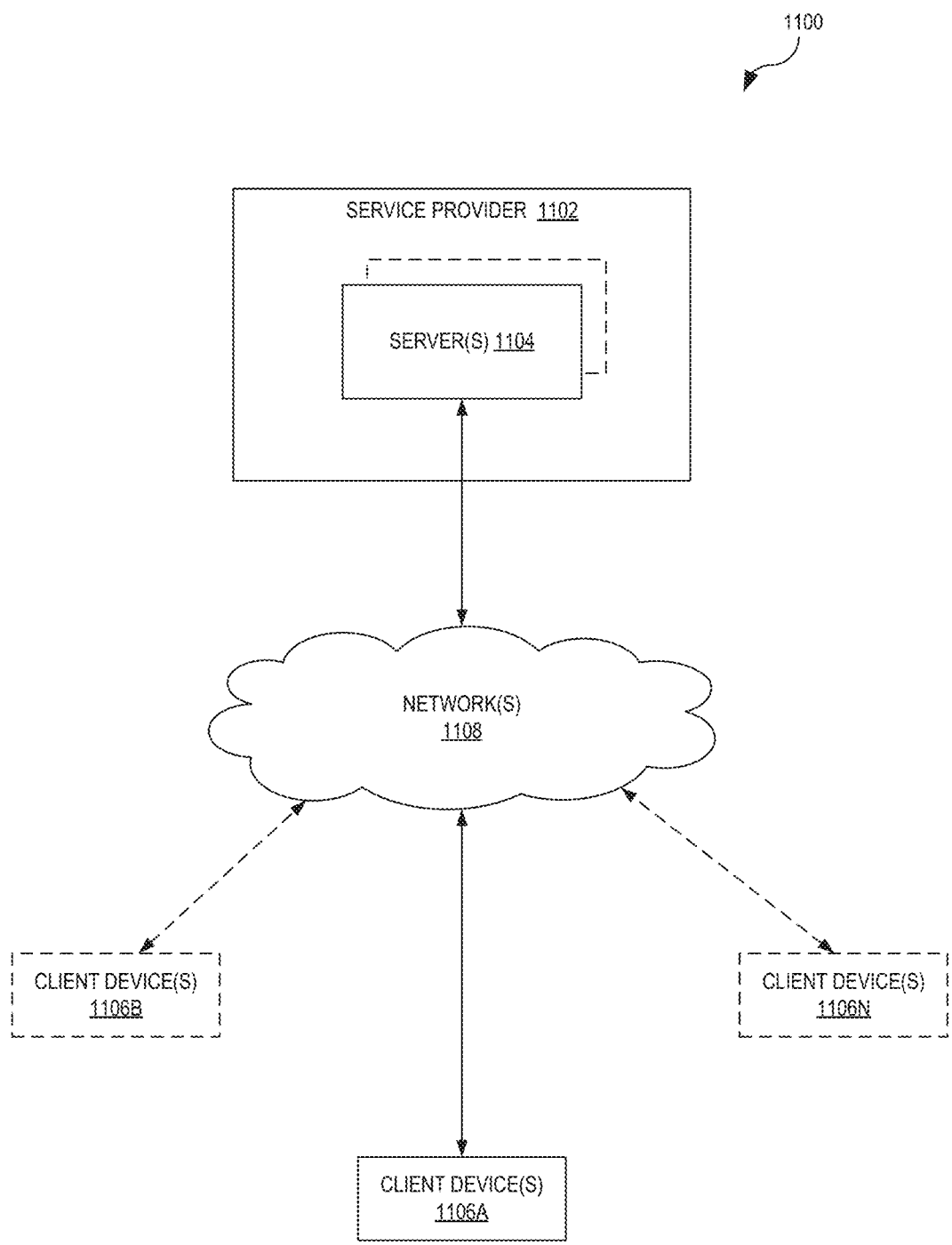
FIG. 11 illustrates a schematic diagram of an exemplary environment in which the node graph optimization system can operate in accordance with one or more embodiments.

FIG. 11 illustrates a schematic diagram of an exemplary environment 1100 in which the node graph optimization system 800 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the Node graph optimization system 800. In particular, the node graph optimization system 800 may be implemented in whole or in part on the client device 1102A.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including differentiable proxies 818, material graph 820, optimized input parameters 822, target images 824, or other information. For example, a server 1104 may receive data from a client device, such as the client device 1106A, and send the data to another client device, such as the client device 1102B and/or 1102N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the node graph optimization system 800. In particular, the node graph optimization system 800 can comprise an application running on the one or more servers 1104 or a portion of the node graph optimization system 800 can be downloaded from the one or more servers 1104. For example, the node graph optimization system 800 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide access to one or more digital images (e.g., the target images 824, such as camera roll or an individual's personal photos) and a material graph 820 stored at the one or more servers 1104. Moreover, the client device 1106A can receive a request (i.e., via user input) to generate an optimized set of input parameters for the material graph 820 to represent the target images 824 and provide the request to the one or more servers 1104. Upon receiving the request, the one or more servers 1104 can automatically perform the methods and processes described above to generate optimized input parameters that, when used in the material graph, generates an output material that represents the target images. The one or more servers 1104 can provide all or portions of output material, material graph, or the optimized input parameters, to the client device 1106A for display to the user.

As just described, the node graph optimization system 800 may be implemented in whole, or in part, by the individual elements 1102-1108 of the environment 1100. It will be appreciated that although certain components of the node graph optimization system 800 are described in the previous examples with regard to particular elements of the environment 1100, various alternative implementations are possible. For instance, in one or more embodiments, the node graph optimization system 800 is implemented on any of the client devices 1106A-N. Similarly, in one or more embodiments, the node graph optimization system 800 may be implemented on the one or more servers 1104. Moreover, different components and functions of the node graph optimization system 800 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
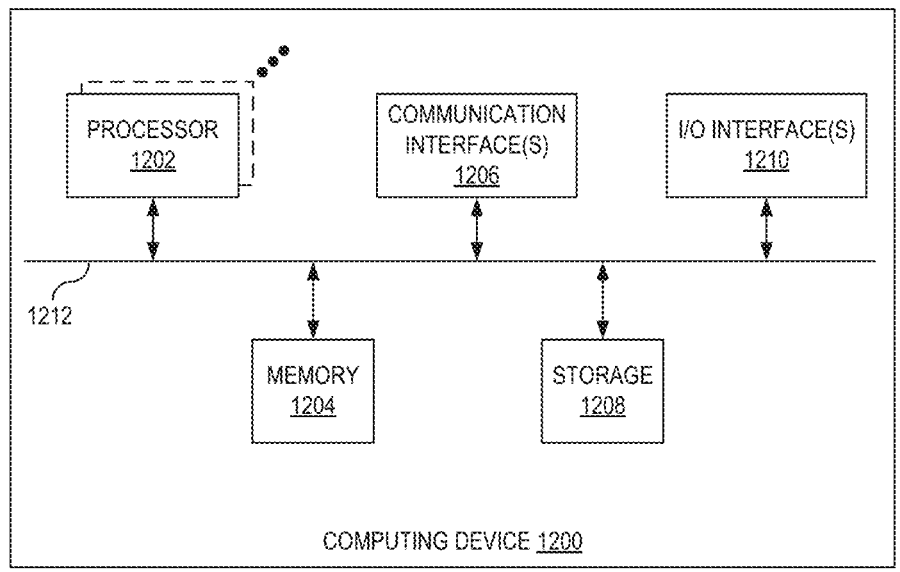
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the node graph optimization system. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example, and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving a target image and a material graph, wherein the material graph is to be optimized for replicating a material of the target image, wherein the material graph includes one or more differentiable nodes for optimizing visual elements of the material and one or more non-differentiable nodes for optimizing structural elements of the material;
   identifying a non-differentiable node of the material graph, wherein the identified non-differentiable node includes a procedure and a set of input parameters used by the procedure for generating a material appearance;
   selecting a differentiable proxy from a library of differentiable proxies, wherein the selected differentiable proxy is trained to replicate the procedure of the identified non-differentiable node;
   generating optimized input parameters for the selected differentiable proxy and the one or more differentiable nodes;
   replacing the set of input parameters of the non-differentiable node of the material graph with the optimized input parameters; and
   generating an output material by the material graph to represent the target image using the optimized input parameters for the non-differentiable node.

2. The method of claim 1, wherein the differentiable proxy is trained by:
   receiving a set of training input parameters and a training material that is generated by the non-differentiable node using the procedure and the set of training input parameters into the differentiable proxy; and
   training the differentiable proxy using the training material and the set of training input parameters to generate a differentiable proxy trained to replicate the procedure of the non-differentiable node.

3. The method of claim 2, wherein training the differentiable proxy comprises:
   sampling a plurality of procedural parameters of the non-differentiable node and a ground truth image; and
   training the differentiable proxy to minimize a pixel difference between the ground truth image and the output material.

4. The method of claim 1, wherein the non-differentiable node is a procedural generator that creates a material map that includes a visual pattern, and wherein the set of input parameters comprise discrete values.

5. The method of claim 1, wherein replacing the set of input parameters of the non-differentiable node of the material graph with the optimized input parameters comprises:
   removing the set of input parameters from the non-differentiable node; and
   inserting the optimized input parameters into the non-differentiable node of the material graph.

6. A method comprising:
   receiving a set of input parameters and a training material that is generated by a non-differentiable node using a procedure and the set of input parameters into a neural network; and
   training the neural network using the training material and the set of input parameters to generate a trained machine learning model, wherein the trained machine learning model is a differentiable proxy from a library of differentiable proxies trained to replicate the procedure of the non-differentiable node, and wherein optimized input parameters are generated for the non-differentiable node using the differentiable proxy.

7. The method of claim 6, the training the neural network comprising:
sampling a plurality of procedural parameters of the non-differentiable node; and
training the neural network to minimize a pixel difference between an output material and the training material.

8. The method of claim 6, wherein the non-differentiable node is a procedural generator that creates a material map that includes a visual pattern, and wherein the input parameters comprise discrete values.

9. The method of claim 6, wherein the training material is a set of material maps that each represent a physical property of a material including albedo, normal, metallic, or roughness.

10. A non-transitory computer-readable medium storing executable instructions, which when executed by a processing device, cause the processing device to perform operations comprising:
receiving a target image that is to be replicated by a material graph;
identifying a non-differentiable node and a differentiable node of the material graph, the non-differentiable node for optimizing structural elements of a material and the differentiable node for optimizing visual elements of the material, wherein the non-differentiable node has a first set of input parameters, and wherein the differentiable node has a second set of input parameters;
selecting a differentiable proxy from a library of differentiable proxies, wherein the selected differentiable proxy is trained to replicate an output of the identified non-differentiable node;
optimizing the first set of input parameters and the second set of input parameters, the optimizing comprising:
generating a first set of optimized input parameters for the differentiable node; and
generating a second set of optimized input parameters for the identified non-differentiable node using a corresponding differentiable proxy and a target image; and
generating an output material by the material graph to represent the target image using the second set of optimized input parameters for the non-differentiable node and the first set of optimized input parameters for the differentiable node.

11. The non-transitory computer-readable medium of claim 10, the operations further comprising:
receiving a target image and a material graph, wherein the material graph is to be optimized for replicating a material of the target image.

12. The non-transitory computer-readable medium of claim 10, the operations further comprising:
replacing the first set of input parameters of the non-differentiable node of the material graph with the first set of optimized input parameters.

13. The non-transitory computer-readable medium of claim 12, wherein the operation of replacing the first set of input parameters of the non-differentiable node of the material graph with the optimized input parameters further causes the processing device to perform operations comprising:
removing the first set of input parameters from the non-differentiable node; and
inserting the first set of optimized input parameters into the non-differentiable node of the material graph.

14. The non-transitory computer-readable medium of claim 12, wherein during the second optimization, the first set of input parameters and the second set of input parameters are optimized.

15. The non-transitory computer-readable medium of claim 10, the operation of optimizing the first set of input parameters and the second set of input parameters further causing the processing device to perform operations comprising:
performing a first optimization of the differentiable node using a first loss function; and
performing a second optimization of the differentiable proxy using a second loss function, wherein the first loss function is different than the second loss function.

16. The non-transitory computer-readable medium of claim 15, wherein during the first optimization, the first set of input parameters of the differentiable proxy is constant.

17. The non-transitory computer-readable medium of claim 10, the operations further comprising:
receiving a set of input parameters and a training material that is generated by the non-differentiable node and a training material graph into the differentiable proxy; and
training the differentiable proxy using the training material and the set of input parameters to generate a differentiable proxy trained to replicate a procedure of the non-differentiable node.

18. The non-transitory computer-readable medium of claim 10, the operation of training the differentiable proxy further causes the processing device to perform operations comprising:
sampling a plurality of procedural parameters of the non-differentiable node and a ground truth image; and
training the differentiable proxy to minimize a pixel difference between an optimized input parameter and the ground truth image.

19. The non-transitory computer-readable medium of claim 10, wherein the non-differentiable node is a procedural generator that creates a material map that includes a visual pattern, and wherein the first set of input parameters comprise discrete values.

20. The non-transitory computer-readable medium of claim 19, wherein a material map represents a physical property of a material including albedo, normal, metallic, or roughness.

* * * * *